Nov. 11, 1924.
V. KAPLAN
1,515,211
DRAFT OR SUCTION TUBE
Filed Sept. 1, 1921
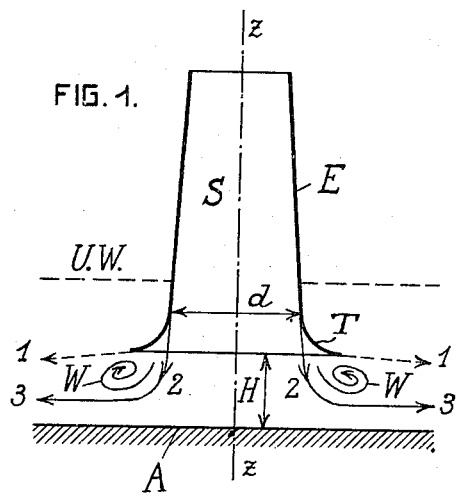
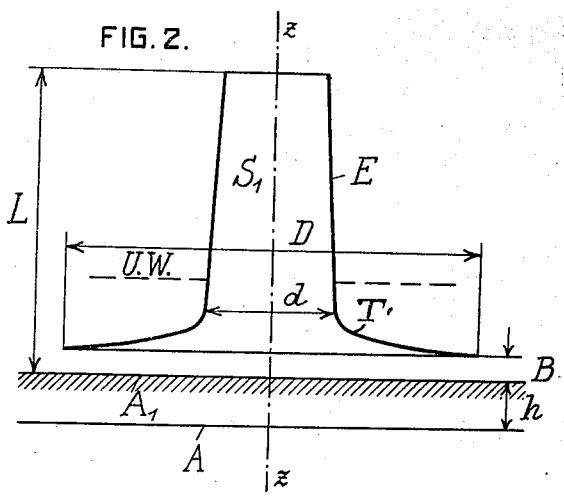
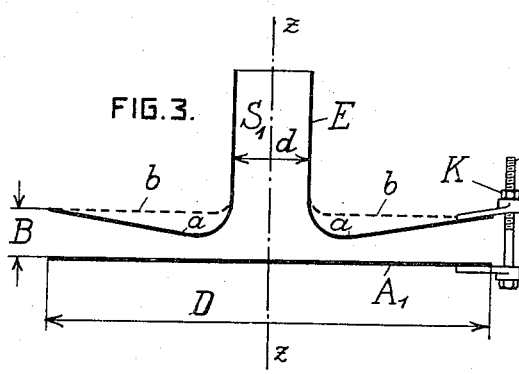
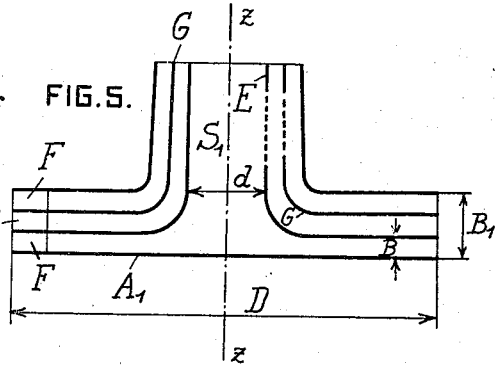
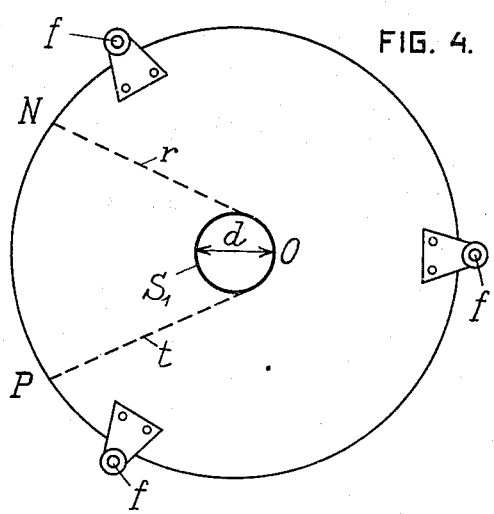
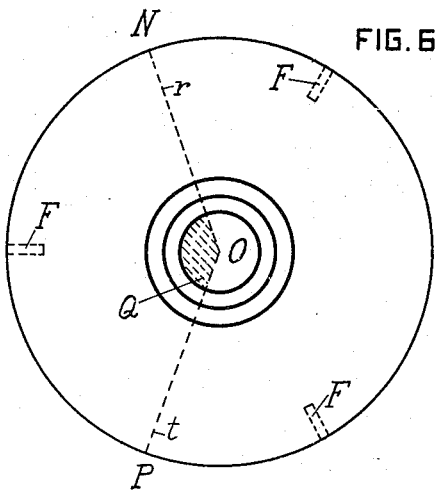
WITNESSES:
INVENTOR:
Victor Kaplan Patented Nov. 11, 1924.

1,515,211

UNITED STATES PATENT OFFICE.

VICTOR KAPLAN, OF BRUNN, CZECHOSLOVAKIA.

DRAFT OR SUCTION TUBE.

Application filed September 1, 1921. Serial No. 497,748.

*To all whom it may concern:*

Be it known that I, VICTOR KAPLAN, a citizen of the State of Czechoslovakia, residing at the Deutsche Technische Hochschule, at Brunn, Czechoslovakia, have invented certain new and useful Improvements in Draft or Suction Tubes (for which I have made application for patent in Belgium on January 18th, 1921; in France on January 7th, 1921; in Italy on January 14th, 1921; in Poland on September 29th, 1920; in Holland on January 4th, 1921; in Denmark on January 12th, 1921; in Sweden on January 7th, 1920; in Norway on November 3rd, 1917; in Switzerland on September 27th, 1919; in England on January 10th, 1921; in Rumania on March 11th, 1921; in Austria on August 2nd, 1916; in Germany on February 1st, 1918; in Czechoslovakia on March 30th, 1920; and in Spain on January 22nd, 1921), of which the following is a specification.

Tubes of this kind as hitherto used are formed as cones of increasing section towards the discharge end, and are frequently employed for converting velocity energy into pressure-energy of flowing liquids, steam or gas in turbines, pumps, steam-ejectors, air-suction devices and the like.

As it is necessary that the enlargement of the tube-section in proportion to the length of the tube should be small, the converting of large quantities of energy requires also a very long tube.

The disadvantages caused thereby can be summarized in a large increase of friction and in difficult and expensive conditions for the construction and installation. The cost is frequently so great that an economical and efficient conversion of energy becomes impossible.

The object of the invention, as hereinafter described is, to avoid said difficulties and drawbacks and to improve the efficiency in such a manner, that a conversion of energy can be successfully achieved even if those forms of tubes hitherto in use, cannot give satisfactory results.

This purpose is obtained by a deflection and spreading out of the jet of fluid according to the natural flowing process, and furthermore by surrounding the jet of fluid with properly shaped walls, so that eddies are avoided as much as possible. The most important condition necessary for a successful conversion of energy is, to avoid such eddies. Accurately speaking, every centrifugal-pump can be considered as a device for the conversion of velocity energy into pressure-energy. Its runner discharges into a system of guide vanes, which have the task of converting velocity into pressure. That this however is, in this case, only imperfectly possible, is demonstrated by the efficiency which is obtained, and this is easily understood on account of the unavoidable eddies, originating in the runner, and which are transmitted to the guide-vanes.

In the accompanying drawing in which the construction and operation of my invention is illustrated in detail, Fig. 1 shows the construction hitherto used of a suction-tube of a water turbine. Fig. 2 shows a suction-tube, designed according to my invention. Fig. 3 shows a vertical section through a suction-tube suitable for the conversion of a large amount of energy. Fig. 4 shows a horizontal projection of same. Fig. 5 is a vertical section through a suction-tube which is provided with deflecting partition-walls in order to permit of the conversion of a greater amount of energy. Fig. 6 shows the top view of same.

In Fig. 1 the bed of the channel is indicated by the letter A, and the tail water-level by the letters U W, in which a suction-tube of the usual construction is shown.

According to the usual theory, the distance H (Fig. 1) of the outlet end from the bed of the channel should be at least equal to half the outlet-diameter (see for instance Camerer, Wasserkraftmaschinen, Berlin-Leipzig 1914, page 483 and following). It is the belief that this large distance is necessary, in order to allow the water an unrestricted passage to flow off. My invention discards this idea and provides instead a suitable guidance of the water in the direction parallel to the bed of the channel for the following reasons:

The water, when leaving the suction-tube, does not follow the bell-shaped rounded end of same, as indicated by the broken line 1, but continues to flow in approximately axial direction, according to line 2; at a point about half-way down to the channel-bed the water is deflected into a direction nearly parallel to the bottom as shown by line 3 and therefore the formation of eddies around the stream-lines 2 and 3 is unavoidable, the harmful effects of which eddies appear in a lowering of the efficiency of the suction-tube. Therefore, it is impossible to increase the amount of converted energy by a bell-shaped discharge-end of the suction-tube as hitherto used, because the water cannot follow the lines of the desired enlargement.

Fig. 2 shows a suction tube, designed according to my invention. In order to allow of an easy comparison, the size of the diameter of the lower suction-tube as well as the inclination of the generating meridian E to the axis $z-z$ are kept the same as in Fig. 1. The channel-bed A however, is raised the amount $h$ to $A_1$ and the bell-shaped enlargement of the tube is so much increased, that the largest diameter D of the outlet end is at least three times the tube-diameter $d$ as measured at the point where the bell-shape begins.

By reason of multidimensional considerations, which were checked and completed by tests, I am enabled to state, that the discharge of water is then equally distributed over the whole discharge-section, if the height B of this section is not larger than one-fifth of the largest discharge-diameter D, and less than that of diameter $d$.

Of course, this proportion cannot be considered an exact limit, beyond which the desired effects suddenly appear, as the roughness of the walls, the velocity of the water and other conditions cause intermediate stages, which must be separately considered in every case. It is however, advantageous in every case, to increase the diameter D as much as possible over the above-mentioned minimum, causing an increase of converted energy, without increasing the length L (Fig. 1) of the tube.

In the usual constructions the distance of the discharge-end from the channel-bed being much too large, and the smallest outlet-diameter being much too small, it is evident, that just these parts of the tube, which would be most effective for the conversion of energy, cannot aid in it.

The usual bell-shaped enlargement of the outlet-end of the tube is therefore entirely useless, as can be proved by tests. A tube designed for the conversion of large amounts of energy is shown in Fig. 3, the discharge-diameter being six times larger than the entrance diameter $d$. As in the tube according to my invention the conversion of energy chiefly takes place near the channel-bed $A_1$, the tubular portion $S_1$ of the tube can be cylindrically constructed, as shown by the parallel position of the generating meridian E to the axis $z-z$.

To obtain the desired effect, it is, however, not necessary to use a bell-shaped curved generatrix up to the outlet-diameter D, as shown in Fig. 2. After the rounding off, a straight line can also be used as generatrix, which can be either inclined or perpendicular relative to the axis $z-z$ as Fig. 3 shows. The former contour shown in full lines in Fig. 3 results in a good flow, permitting the aforesaid increase of the height of discharge B. But I can also, make the profile ($b$) perpendicular to the tube-axis, which is indicated in the same figure by the broken lines. Such a profile simplifies the construction of the tube. If the tail-race is narrow, compared with the tube-diameter, obstructions can occur, which hinder the proper flow of the water. In such a case it is necessary to reduce the tube-diameter as much as possible. To obtain a sufficient conversion of energy even in such a case it is advantageous to use a tube with intermediate deflection-walls as shown in Figs. 5 and 6. In these figures severed tubes, constructed according to my invention, are placed over one another, so that the annular spaces between the separate tubes expand radially towards the outlet. If required, several more such tubes can be employed. Fig. 5 shows, for example, two such tube-walls. With such an arrangement the height $B_1$ of the whole cylindrical outlet-surface is considerably increased as compared with that of a single tube. The outlet velocity is uniformly distributed and therefore even with a small outlet-diameter of the nozzle, a great amount of energy can be converted.

In the case of high velocities it is however advisable to diminish the friction against the walls by reducing the wetted surface of same. This can be effected without disadvantage by removing those portions of the walls, where a special guidance is not required. This is generally the case in the middle part of the tube. Special guiding surfaces can also be dispensed with at the tube-inlet, if the enlargement of the tubular portion of the tube is not great. The right-hand half of Fig. 5 shows a tube, the partition-walls of which are only fitted near the inlet and outlet-surfaces, as shown by the broken lines G and E.

The conditions for mounting the tube can however be sometimes such, that it would be advantageous, not to let the water flow off the whole circumference of the outlet sectional-area, but only along a part of it. This for instance, will be the case, if the tube is arranged in the vicinity of a channel-wall. In order not to interrupt the natural flow of the water under such mounting conditions, a wedge-shaped sector of the above described tube is provided, as the horizontal-projections in Figs. 4 and 6 show. The two broken lines $r$ and $t$ correspond with the two side-walls of the tube-wedge NOP, which permits of the required one-sided water-discharge. To this end, the side-walls, which stand at least nearly at right-angles to the channel-bed or bottom-area, can be either tangentially joined to the tubular portion of the tube $S_1$, as is shown in Fig. 4 or the two walls can be laid through the axis $z-z$ of the tube, in which case they lie in meridianal planes as shown in Fig. 6. By such an arrangement the natural flow is better preserved, but of course the hatch-lined-shaped tube inlet-section Q must be led over to a circular section, if the water-jet, whose energy is to be converted, requires such a section. Such tubes with a onesided discharge can also be used advantageously in the case of horizontal shaft turbines as a substitute for the suction-tubes hitherto used in connection with suction-bends, since the usual arrangement of the bend is quite unfitted to convert a greater amount of energy. A tube, constructed according to my invention can either be mounted in such a way, that the channel-bed A can simultaneously serve as the bottom-area of the tube, as shown in Fig. 2, or the bottom-wall can be joined to the tube-casing by radially-placed bridges F, as shown in Figs. 5 and 6. An adjustable fastening of the bottom-wall is especially advantageous, as for instance in the arrangement shown in Figs. 3 and 4, in which the adjustability is effected by screws and nuts K. Of course other fastening devices can be used. By such an arrangement the tube-section can be experimentally adjusted, so as to achieve the best conversion of energy under the existing working-conditions.

A suction tube constructed according to my invention, cannot only be used as a substitute for the turbine-suction-tubes hitherto used, but offers advantages everywhere, where it is necessary to convert large amounts of velocity-energy into pressure-energy of flowing liquids. This is not only the case with all kinds of centrifugal-machines, but also with ejectors, air- and gas-suction-devices and the like.

Of course the type and nature of the working fluid (liquid, steam, gas and the like) are not limited in any way.

Claims for patent:

1. Suction-tube for converting velocity energy into pressure energy, comprising a tubular portion terminating in a flared end, the maximum diameter of said end being at least three times that of the adjacent end of said tubular portion, and the distance of the mouth of said flared end from the bed of the channel being less than one-fifth of the diameter of said flared end less than that of the said end of the tubular portion.

2. In the tube of claim 1, the tubular portion being tapered with its larger end merging into said flared portion, and said flared portion being bell-mouth-shaped.

3. In the tube of claim 1, a similarly shaped tube enclosing the primary tube, the annular space between the two tubes increasing in cross-sectional area towards the outlet.

4. In the tube of claim 1, a plurality of similarly shaped tubes surrounding the primary tube, some of said additional tubes having only rudimentary tubular portions.

In testimony whereof I affix my signature in presence of two witnesses.

VICTOR KAPLAN.

Witnesses:
MARIANNE KNY,
D. HUTTEN.